3,450,766
AMMONOLYSIS OF 1,6-DIHALOHEXANE
Walter E. Steinmetz, Shreveport, La., assignor to El Paso Products Company, Odessa, Tex., a corporation of Texas
No Drawing. Continuation-in-part of application Ser. No. 484,801, Sept. 3, 1965. This application July 5, 1966, Ser. No. 562,505
Int. Cl. C07c 85/04
U.S. Cl. 260—585       5 Claims

ABSTRACT OF THE DISCLOSURE

Process for producing hexamethylenediamine, useful as an intermediate for producing nylon, comprising reacting 1,6-dihalohexane with about 50 to 300 moles of anhydrous liquid ammonia per mole of 1,6-dihalohexane at a temperature of about 0° to 100° C. and a pressure of about 100 to 1000 p.s.i.g., and recovering the product produced.

---

This application is a continuation-in-part of application, Ser. No. 484,801, filed Sept. 3, 1965.

This invention relates to ammonolysis reactions and more particularly to the production of hexamethylenediamine by the direct ammonolysis of 1,6-dihalohexane.

As is well known, the nylon industry has assumed a role of vast commercial importance due in large measure to the unique characteristics of polyamide-type resins which render them highly valuable for use in a wide variety of commercial applications. The ever-increasing demand for nylon-type products has correspondingly initiated wide-spread commercial demand for the provision of feasible processes for the production of nylon intermediates and especially hexamethylenediamine. This latter material is of course, basic to the preparation of the several grades of nylon, and accordingly, a large measure of industrial research effort has been directed to improved processes for its synthesis economically.

It is well known that alkyl halides can be converted directly to their corresponding amine derivatives by treatment with ammonia. However, the methods heretofore provided for effecting such conversions have required the use of elevated temperatures on the order of 125° C. and often in excess of 200° C. These elevated temperature conditions have been found to result in commercially feasible reaction rates, product yield, etc. However, the products derived from these prior processes have generally been composed of a mixture of various mono- and polyamines and high molecular weight materials which are difficultly separable. Therefore, it has been necessary to resort to further treatments, e.g. fractional distillation, extraction and the like, in order to eventually separate and isolate the desired product. Furthermore the use of elevated temperatures frequently have given rise to excessive amounts of undesirable by-products.

It is accordingly, one object of the present invention to provide a new and improved process for the direct ammonolysis of 1,6-dihalohexanes to produce hexamethylenediamine in a predominant amount under relatively mild conditions.

A further object and advantage of the present invention resides in the provision of a new and improved ammonolysis process for the selective formation of hexamethylenediamine from 1,6-dihalohexanes wherein the formation of undesirable side products is minimized.

A primary advantage of the present invention is that the direct ammonolysis of 1,6-dihalohexanes to selectively form the desired hexamethylenediamine in a predominant amount may be carried out under mild reaction conditions and without the use of expensive high pressure equipment such that an efficient and reliable economically feasible process for hexamethylenediamine production is presented.

Briefly stated, these and other objects and advantages of the present invention are realized by the provision of a new and improved process for the direct ammonolysis of 1,6-dihalohexanes to form hexamethylenediamine which comprises reacting the 1,6-dihalohexane with a large excess of anhydrous liquid ammonia at a temperature of about 100° C. and a pressure of about 100 to 1000 p.s.i.g. removing the excess ammonia from the reaction mixture, treating with a base and separating the freed diamine product.

It has now been discovered that hexamethylenediamine may be produced by the direct ammonolysis of 1,6-dihalohexanes without the formation of undesirable secondary, tertiary and cyclic amine derivatives which are formed in excessive amounts in all known prior art processes. The process of this invention has been found to result in substantially one hundred percent conversions of the dihalide. The reaction is carried out without the necessity of unwieldy catalytic systems and costly high pressure equipment and therefore offers a commercially attractive method for hexamethylenediamine formation.

Contrary to the prior processes described above, the amine-forming reaction contemplated for use herein is carried out under relatively mild temperature conditions employing specific proportions of the ammonia reactant. The reaction is also carried out under slight conditions of pressure as contrasted with high pressure synthesis.

The ammonolysis reaction is performed in the presence of an excess of anhydrous ammonia, the latter being employed in the liquid phase. The ammonia reactant is employed in a large excess corresponding to a molar ratio of about 50 to 300 moles, per mole of 1,6-dihalohexane, a ratio which has been found to result in selective production of the desired hexamethylenediamine. This result is somewhat surprising as it would ordinarily be expected that the ammonia and dihalohexane would react to form high molecular weight derivatives of the resinous variety. However, when operating under the conditions hereinafter specified, it has been found that any tendency for production of such products is substantially eliminated.

The 1,6-dihalohexanes to which the process of the invention is applicable are the dihalides of the following formula:

X—CH$_2$CH$_2$CH$_2$CH$_2$CH$_2$CH$_2$—X wherein X is a halogen atom, preferably bromine.

An advantage of the instant reaction is that acidic materials such as an ammonium halide are not necessary to attain the objects of the invention. This is in contradistinction to prior processes where the presence of a material, such as ammonium chloride, was thought necessary to prevent excessive by-product formation.

The amination process of this invention is carried out under mild conditions of temperature as specified hereinabove. The reaction temperature lies in the range of about 0° to 100° C., preferably about 10° to 50° C. An especially preferred reaction temperature is about 30° C.

At these temperatures, it has been found that the pressure of the reaction should be maintained at about 100 to 1000 p.s.i.g. depending on the temperature employed. A preferred pressure for operation is about 100 to 500 p.s.i.g. with an especially preferred reaction pressure of about 200 p.s.i.g. Hence, another advantage of the process is realized by obviating the need for expensive high pressure operating equipment such as that required when operating on the order of 4000 p.s.i.g. and above.

The reaction ordinarily requires from about ten minutes to about five hours to go to completion depending on the conditions employed. However, the reaction is preferably conducted by mixing the reactants within a relatively short period, such as fifteen to twenty-five minutes and thereafter agitating until the reaction goes to completion.

The reaction is conducted by charging the anhydrous liquid ammonia to a stirred reactor and adding the 1,6-dihalohexane thereto over a short period and thereafter agitating. After completion of the reaction, and removal of the excess ammonia, the resulting aminated mixture is neutralized with a base to free the amine from its hydrogen halide salt. Thereafter, the hydrocarbon component of the effluent is separated and sent to a conventional distillation train for purification of the diamine. The excess ammonia reactant is recycled in a continuous process and the meal halide formed may be recovered for processing.

The metal halide recovered may be suitably processed to recover the free halogen as hydrogen halide.

The followng example illustrates the application of the novel amination reaction of this invention as applied to the amination of 1,6-dibromohexane to produce hexamethylenediamine. However, the example is to be considered solely as illustrative of the invention and not limiting thereon.

EXAMPLE I

The reactor employed in this example comprised a 1-liter stainless steel autoclave with agitation provided by a Magne-dash stirrer.

19.4 gram moles of anhydrous liquid ammonia were charged to the autoclave and the stirring commenced. Then, 0.065 gram mole of 1,6-dibromohexane was added over a period of about 25 minutes. Thereafter, the reactor was agitated for four hours at a temperature of about 30° C. and a pressure of about 200 p.s.i.g. The starting material amounts added represent a ratio of 298 moles of ammonia to 1 mole of 1,6-dibromohexane.

At the conclusion of the reaction, the autoclave was first vented to remove excess ammonia after which the contents were dissolved in 100 ml. of methanol. The residue was then treated with 16 grams of $NaOCH_3$ dissolved in methanol and the solution filtered to remove precipitated sodium bromide. This mixture was sampled and analyzed by means of gas chromatography and the results thereof are appended in table below.

TABLE

| Product | 298 moles $NH_3$/mole 1,8-dibromohexane | |
|---|---|---|
| | Wt. percent | Percent efficiency |
| Hexamethyleneimine | 13.01 | 14.8 |
| Hexamethylenediamine | 82.70 | 80.5 |
| Other dimers | 1.52 | 1.69 |
| Cyclic dimers | 1.99 | 2.26 |
| Linear dimers | 0.78 | 0.79 |

What is claimed is:
1. A process for the production of hexamethylenediamine which comprises reacting a 1,6-dihalohexane with about 50 to 300 moles of anhydrous liquid ammonia per mole of 1,6-dihalohexane at a temperature of about 10° to 50° C. and a pressure of about 100 to 1000 p.s.i.g., treating the resultant mixture with a base to free the diamine from its hydrohalide salt and recovering the hexamethylenediamine.

2. A process according to claim 1 wherein the reaction is conducted at a temperature of about 30° C.

3. A process according to claim 2 wherein the reaction is conducted at a pressure of about 200 p.s.i.g.

4. A process according to claim 3 wherein the 1,6-dihalohexane is 1,6-dibromohexane.

5. A process according to claim 1, wherein the base is $NaOCH_3$.

References Cited
UNITED STATES PATENTS

| | | | |
|---|---|---|---|
| 2,034,427 | 3/1936 | Campbell | 260—585 X |
| 2,268,620 | 1/1942 | Rigby | 260—585 X |

FLOYD D. HIGEL, *Primary Examiner.*

D. L. RAYMOND, *Assistant Examiner.*